Figure 1:
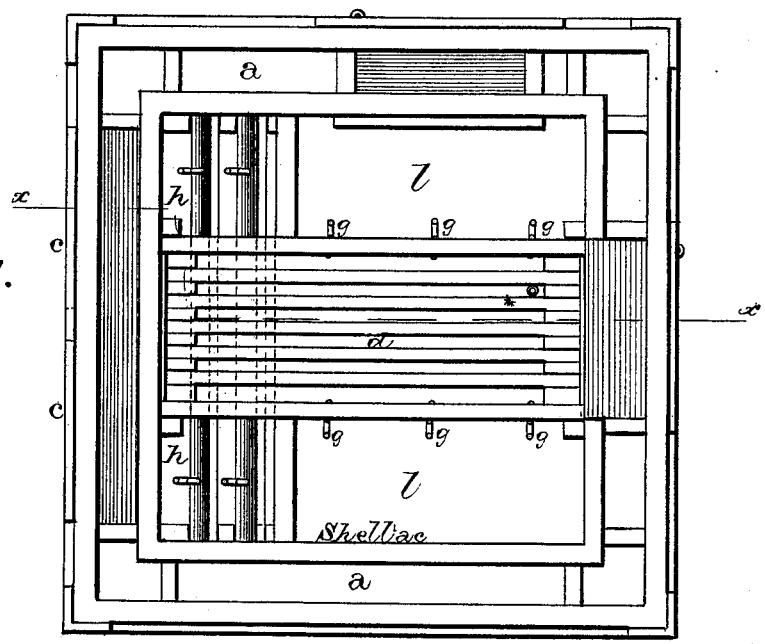
Figure 2:
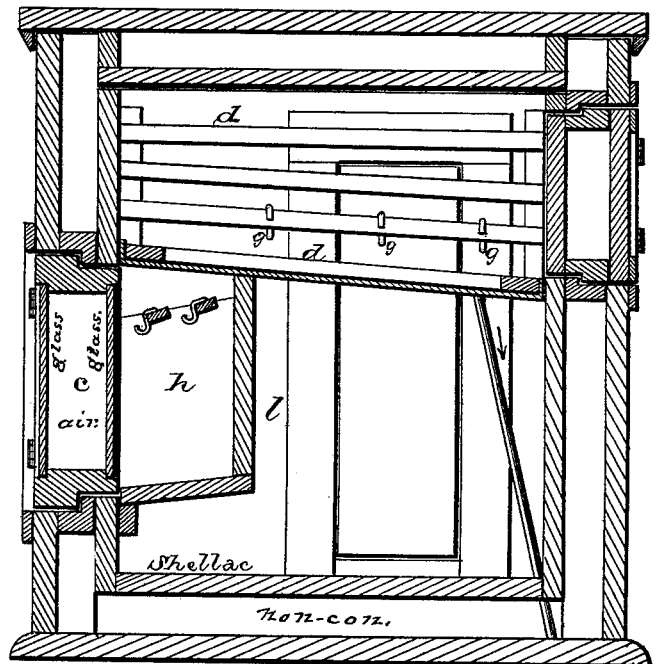

J. O. BECK.
REFRIGERATOR.

No. 175,011. Patented March 21, 1876.

UNITED STATES PATENT OFFICE.

JOHN O. BECK, OF LA PORTE, INDIANA.

IMPROVEMENT IN REFRIGERATORS.

Specification forming part of Letters Patent No. 175,011, dated March 21, 1876; application filed February 29, 1876.

*To all whom it may concern:*

Be it known that I, JOHN O. BECK, of La Porte, in the county of La Porte and State of Indiana, have invented certain new and useful Improvements in Refrigerators; and I do hereby declare the following to be a full, clear, and exact description of the invention, such as will enable others skilled in the art to which it pertains to make and use it, reference being had to the accompanying drawings, which form part of this specification.

My invention relates to an improvement in refrigerators; and it consists in the arrangement and combination of parts that will be more fully described hereinafter, whereby meat and other similar articles may be kept in a perfect state of preservation for an indefinite length of time.

The accompanying drawings represent my invention.

$a$ represents the frame-work, which is made of any desired shape or size. The walls, top, and bottom, are all made hollow, and then filled in with sawdust, tan-bark, or other non-conducting substance, so as to keep the temperature within always the same. The doors on the side, and the hole in the rear side for the introduction of ice, are also made in this manner, and made to close tightly, so that no leakage of air can possibly take place. The two doors, $c$, in the front side are also made thick, but, instead of being filled like the others, are left hollow, and their front and inner sides stopped by a pane of glass, so that a person can always see directly into the refrigerator, and thus know the condition of things without opening the door and admitting warm air. The space between the two panes of glass forms a dead-air chamber, so that no change of temperature in the air outside will effect the temperature of the air inside of the refrigerator. Across the top of the refrigerator is made the ice-rack $d$, in which the ice is placed. This rack consists of bars on the bottom and sides, and underneath the bottom is placed a casing of sheet-iron, to catch the water as it drips from the ice, which water is then carried off through a pipe. Upon the bars which form the side of this rack are suspended hooks, $g$, upon which can be hung meat and other such perishable articles. Where the refrigerator is built large enough, this construction is especially adapted for the use of butchers, as whole sheep, hogs, and quarters of beeves can be hung up.

Across the front of the inside, under and at right angles to the ice rack, is formed a separate compartment, $h$, which is open at its top, and lighted by the glass doors. In this chamber are several rods provided with hooks, upon which different articles can be hung. This chamber is intended for smaller articles than are to be placed in the large chamber $l$.

In order to prevent the accumulation of dampness, moisture, and mildew in the refrigerator, the whole inside is thoroughly shellaced, which makes the wood water-proof. Any moisture that may be formed in the air will be condensed against the walls, and at once run down to the floor and make its escape.

A refrigerator constructed in this manner is simple, cheap, and will save a large amount, each season, to every one who uses them.

Having thus described my invention, I claim—

In a refrigerator, the combination of the two chambers, $h$ $l$, ice-rack $d$, and doors $c$, the chamber $h$ being located in front of the one, $l$, and having for its ceiling a portion of the bottom of the ice-rack, and elsewhere being open at the top, substantially as shown and described.

In testimony that I claim the foregoing I have hereunto set my hand this 22d day of February, 1876.

JOHN O. BECK.

Witnesses:
WM. H. H. WHITEHEAD,
J. B. LINARD.